United States Patent
Wang et al.

(10) Patent No.: US 9,325,704 B2
(45) Date of Patent: Apr. 26, 2016

(54) DATA ACCESS METHOD AND DEVICE

(71) Applicant: ZTE Corporation, Shenzhen, Guangdong (CN)

(72) Inventors: Yanping Wang, Shenzhen (CN); Zitao Xue, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/421,630

(22) PCT Filed: Jun. 21, 2013

(86) PCT No.: PCT/CN2013/077714
§ 371 (c)(1),
(2) Date: Feb. 13, 2015

(87) PCT Pub. No.: WO2014/026505
PCT Pub. Date: Feb. 20, 2014

(65) Prior Publication Data
US 2015/0304317 A1    Oct. 22, 2015

(30) Foreign Application Priority Data
Aug. 17, 2012    (CN) .......................... 2012 1 0294823

(51) Int. Cl.
*H04L 29/06* (2006.01)
*H04W 8/18* (2009.01)
(Continued)

(52) U.S. Cl.
CPC ........... *H04L 63/0853* (2013.01); *H04W 8/183* (2013.01); *H04W 12/06* (2013.01); *H04W 88/02* (2013.01); *H04W 88/18* (2013.01)

(58) Field of Classification Search
None
See application file for complete search history.

(56) References Cited

U.S. PATENT DOCUMENTS 6,125,283 A * 9/2000 Kolev ................... H04W 48/18
455/527
8,369,823 B2   2/2013 Chen
(Continued)

FOREIGN PATENT DOCUMENTS

CN    1921661 A     2/2007
CN    101141743 A   3/2008
CN    102843669 A   12/2012

OTHER PUBLICATIONS

International Search Report in international application No. PCT/CN2013/077714, mailed on Sep. 26, 2013.
(Continued)

*Primary Examiner* — Leon-Viet Nguyen
(74) *Attorney, Agent, or Firm* — Oppedahl Patent Law Firm LLC

(57) ABSTRACT

Disclosed are a data access method and device. The method comprises: a terminal sending an authentication request to a server, the authentication request being used for requesting the server to verify whether a SIM card in the current terminal is a SIM car bound in the server by the terminal; if the terminal receives an authentication failure message, which is returned by the server, the terminal not permitting a user to access the data in the terminal, the authentication failure message being used for indicating that the SIM card in the current terminal is not the SIM card bound in the server by the terminal. The present invention can solve the technical problem in the prior art that the purpose of increasing data security is not achieved because the terminal and the SIM card are only in a binding state, and achieve the technical effect of increasing data security in the terminal.

10 Claims, 4 Drawing Sheets

(51) Int. Cl.
*H04W 12/06* (2009.01)
*H04W 88/02* (2009.01)
*H04W 88/18* (2009.01)

(56) References Cited

U.S. PATENT DOCUMENTS

2007/0286373 A1* 12/2007 Pailles .................. H04L 9/3234
379/142.03
2008/0161050 A1* 7/2008 Shudark ................ H04W 12/08
455/558
2011/0161414 A1* 6/2011 Satoda ................. H04N 7/1675
709/203
2012/0058743 A1 3/2012 Chen
2013/0283040 A1* 10/2013 Tu ......................... H04W 4/003
713/155
2014/0259121 A1* 9/2014 Blewett .................. H04L 63/08
726/4

OTHER PUBLICATIONS

English Translation of the Written Opinion of the International Search Authority in international application No. PCT/CN2013/077714, mailed on Sep. 26, 2013.

* cited by examiner

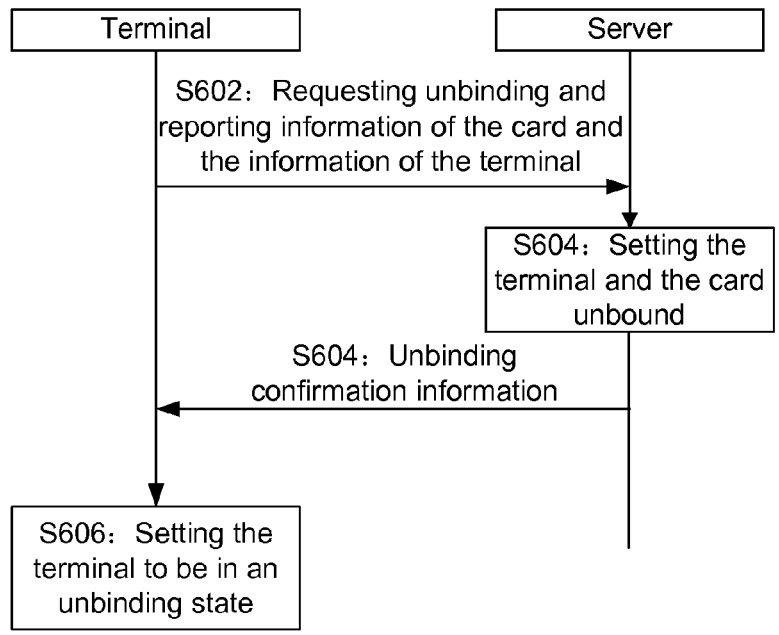
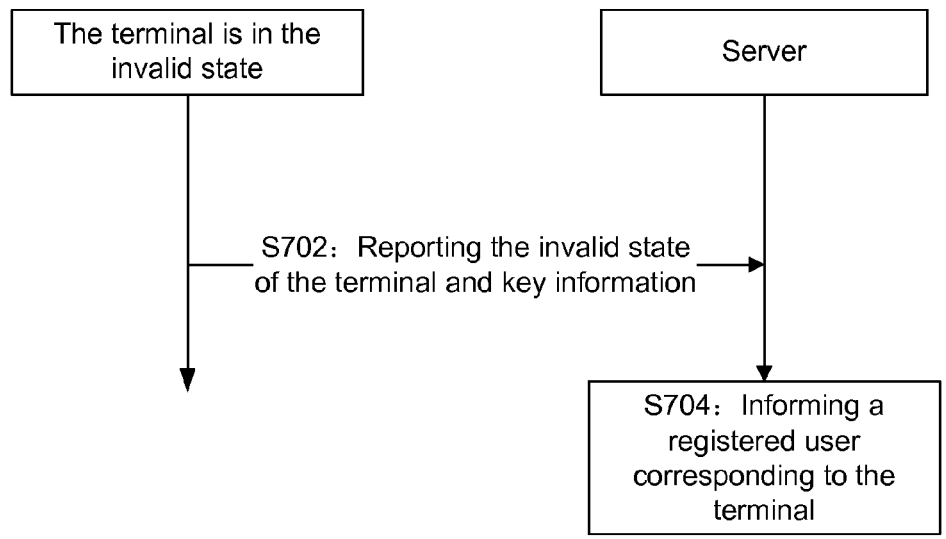

DATA ACCESS METHOD AND DEVICE

TECHNICAL FIELD

The disclosure relates to the field of communications, and particularly relates to a data access method and device.

BACKGROUND

Currently, there are many methods for binding User Equipment (UE) and a card, some of them however only have a function of locking the user equipment and the card. Many schemes for binding user equipment and a card in the current market also merely bind a terminal and a card (such as a Subscriber Identity Module (SIM) card). That is, the terminal can only use a corresponding card, while other cards cannot be used in this terminal. This is a so-called UE-card binding.

However, this kind of UE-card binding scheme does not functions to protect safety of user data. That is, though a locking method is used by this current UE-card binding scheme, leakage of user data cannot be prevented. Moreover, when the terminal is lost or the card is out of the terminal, data in the terminal cannot be destroyed automatically to prevent the leakage of the data in the terminal.

Aiming at the above problem, an effective solution has not been proposed currently.

SUMMARY

An embodiment of the disclosure provides a data access method and device, to at least solve a technical problem in the related art, that a terminal and a SIM card are only in a binding state and a purpose of improving data safety is not achieved.

According to an aspect of the embodiment of the disclosure, a data access method is provided. This method includes: a terminal sends a server an authentication request which is used to request the server to verify whether a SIM card in the terminal is a SIM card bound with terminal or not; and if the terminal receives an authentication failure message returned by the server, the terminal refuses a user corresponding to the SIM card in the terminal to access data stored in the terminal, in which the authentication failure message is used to indicate that the SIM card in the terminal is not the SIM card bound with the terminal.

Preferably, the above method may further include: after the terminal receives the authentication failure message returned by the server, the terminal uploads identification information of the terminal and identification information of the SIM card in the terminal to the server.

Preferably, the above method may further include: after the terminal receives the authentication failure message returned by the server, the terminal sends an indication message to the server, in which the indication message is used to indicate the server to send the above authentication failure message to a user corresponding to the above terminal.

Preferably, the operation of sending by the terminal the authentication request to the server may at least include one of the following: when the terminal detects that the terminal itself is booting up, the terminal sends the authentication request to the server; when the terminal detects that the SIM card in the terminal is not the same as a SIM card detected last time, the terminal sends the authentication request to the server; and when the terminal detects that a current registration network is not the same as a registration network detected last time, the terminal sends the authentication request to the server.

Preferably, the above method may further include: after the terminal sends the authentication request to the server, in the case the terminal receives an authentication success message returned by the server, the terminal allows the user corresponding to the SIM card in the terminal to access the data stored in the terminal, in which the authentication success message is used to indicate that the SIM card in the terminal is the SIM card bound with the terminal.

Preferably, the operation of returning by the server the authentication success message may include: the server compares a SIM card identification of the SIM card in the terminal carried in the authentication request with a SIM card identification of a SIM card stored in the server which is bound with this terminal; and in the case the two SIM card identifications are the same, it is indicated that the SIM card in the terminal is the SIM card bound with the terminal, and the server sends the authentication success message to the terminal.

Preferably, the above method may further include: after the terminal receives the authentication success message returned by the above server, the terminal sends an unbinding request message to the server, in which the unbinding request message is used to indicate the server to cancel a binding relationship stored in the server between the terminal and the bound SIM card.

Preferably, the above method may further include: after the terminal receives the authentication success message returned by the server, the terminal receives a data deleting request sent by the server; and in response to the data deleting request, the terminal deletes the data stored in the terminal.

According to another aspect of the embodiment of the disclosure, a data access device is provided, which is located in a terminal. The data access device includes:

a first sending unit, configured to send an authentication request to a server, in which the authentication request is used to request the server to verify whether a SIM card in the terminal is a SIM card bound with the terminal or not; and a prohibition unit, configured to refuse, if the terminal receives an authentication failure message returned by the server, a user corresponding to the SIM card in the terminal to access data stored in the terminal. The authentication failure message is used to indicate that the SIM card in the terminal is not the SIM card bound with the terminal.

Preferably, the above device may further include: a second sending unit, configured to send, after the terminal receives the authentication failure message returned by the server, an indication message to the server. The indication message is used to indicate the server to send the authentication failure message to a user corresponding to the terminal.

In the embodiments of the disclosure, at a server side, the terminal and the SIM card are in a binding state, in a one-to-one relationship. The terminal may send an authentication request to the server to determine whether the SIM card currently in the terminal is the SIM card registered in the server or not, so as to determine whether the terminal is in safety. If the SIM card currently in the terminal is not the SIM card registered in the server, then it is determined that the terminal is not in safety. Then, the terminal sets the data stored in the terminal to be unreadable, thus effectively improving data safety. Through the above way, the technical problem in the related art, that the terminal and the SIM card are only in a binding state, and the purpose of improving data safety is not achieved, is solved, and a technical effect of improving data safety in the terminal is achieved.

BRIEF DESCRIPTION OF THE DRAWINGS

The drawings illustrated here are used to provide further understanding of the disclosure, and construct a portion of this application. Embodiments of the disclosure and the explanation thereof are used to interpret the disclosure, and do not construct improper limitation of the disclosure. In the accompanied drawings:

FIG. 6 is an interaction flowchart of requesting unbinding by a terminal according to an embodiment of the disclosure;

FIG. 7 is an interaction flowchart of reporting key information of a terminal according to an embodiment of the disclosure;

DETAILED DESCRIPTION

The disclosure will be explained in detail in reference with the accompanied drawings and in combination with the embodiments below. It should be noted that, an embodiment in this application and a feature in an embodiment may be combined with each other if they do not conflict with each other.

Figure 1:
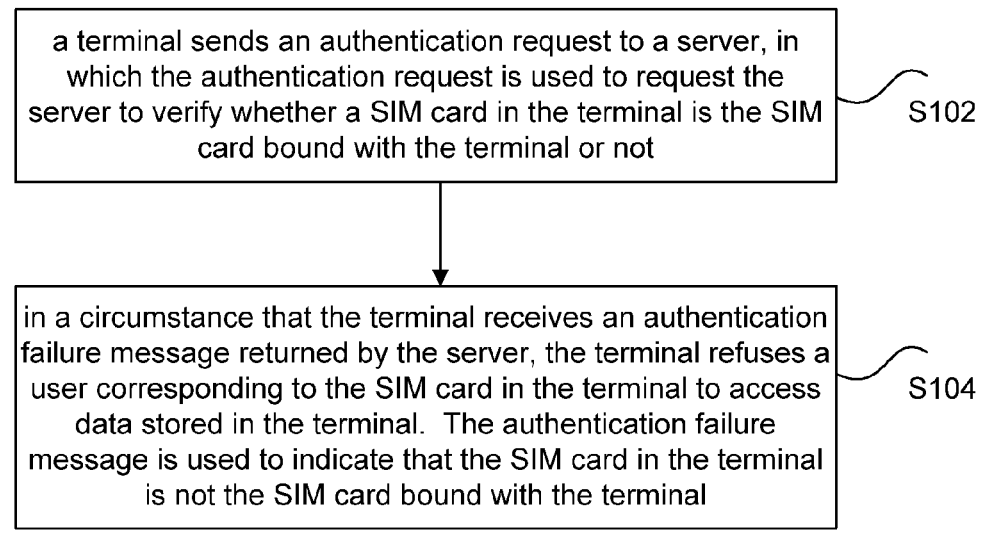
FIG. 1 is a preferred flowchart of a data access method according to an embodiment of the disclosure.

An embodiment of the disclosure provides a data access method, as shown in FIG. 1, which includes the following steps.

Step S102: a terminal sends an authentication request to a server. The authentication request is used to request the server to verify whether a SIM card in the terminal is the SIM card bound with the terminal or not.

Step S104: in a circumstance that the terminal receives an authentication failure message returned by the server, the terminal refuses a user corresponding to the SIM card in the terminal to access data stored in the terminal. The authentication failure message is used to indicate that the SIM card in the terminal is not the SIM card bound with the terminal.

In the above preferred embodiment, at a server side, the terminal and a SIM card are in a binding state, namely in a one-to-one relationship. The terminal may send an authentication request to the server to determine whether the SIM card inserted in the terminal is the SIM card registered in the server or not and to determine whether the terminal is in safety or not. If it is determined the SIM card inserted in the terminal is not the SIM card registered in the server, then it is determined that the terminal is not in safety, and the terminal sets the data stored in the terminal itself to be unreadable, thus effectively improving data safety. Through the above way, the technical problem in the related art, that the terminal and the SIM card are only in the binding state and the purpose of improving data safety is not achieved, is solved, and a technical effect of improving data safety in the terminal is achieved.

When the terminal determines that the terminal itself is in an unsafe state, some key information of the terminal itself may be uploaded actively to the server, so that the server may perform corresponding treatment according to these key information. The above key information may be identification information of the SIM card, or the recognition information of the terminal (for example, an International Mobile Equipment Identity (IMEI) of terminal). In a preferred embodiment, after the terminal receives the authentication failure message returned by the server, the method may further include: the terminal uploads the identification information of the terminal and the identification information of the SIM card in the terminal to the server.

After receiving the authentication failure message returned by the server, the terminal may actively notify the server such that the server can inform the owner of the terminal of abnormal information occurred in this terminal through a pre-defined channel by using user information already registered in the server. For example, a mailbox address of the owner of the terminal is pre-stored on a server, and the server informs the user of this terminal of this abnormal information through the pre-stored mailbox address. In a preferred embodiment, after the terminal receives the authentication failure message returned by the server, the method may further include: the terminal sends an indication message to the server. The indication message is used to indicate the server to send the authentication failure message to the user corresponding to the terminal.

A trigger condition of sending the authentication request may comprise that upon boot-up of a terminal, change of the SIM card is detected, or the registration network of the terminal changes. In a preferred embodiment, the terminal sends the authentication request to the server under one of the following situations (but not limited to these situations):

1) when the terminal detects the terminal itself is booting up, the terminal sends the authentication request to the server;

2) when the terminal detects the SIM card in the terminal itself is not same as the SIM card detected last time, the terminal sends the authentication request to the server; and 3) when the terminal detects that the current registration network is not same as the registration network detected last time, the terminal sends the authentication request to the server.

An inventive concept of the embodiment of the disclosure is to allow the user to access the data stored in the terminal itself only in the circumstance that the verification is passed. In a preferred embodiment, after the terminal sends the authentication request to the server, the method may further include: in the circumstance that the terminal receives an authentication success message returned by the server, the terminal allows the user to access the data stored in the above terminal. The authentication success message is used to indicate that the SIM card currently in the terminal is the SIM card bound with the terminal.

Figure 2:
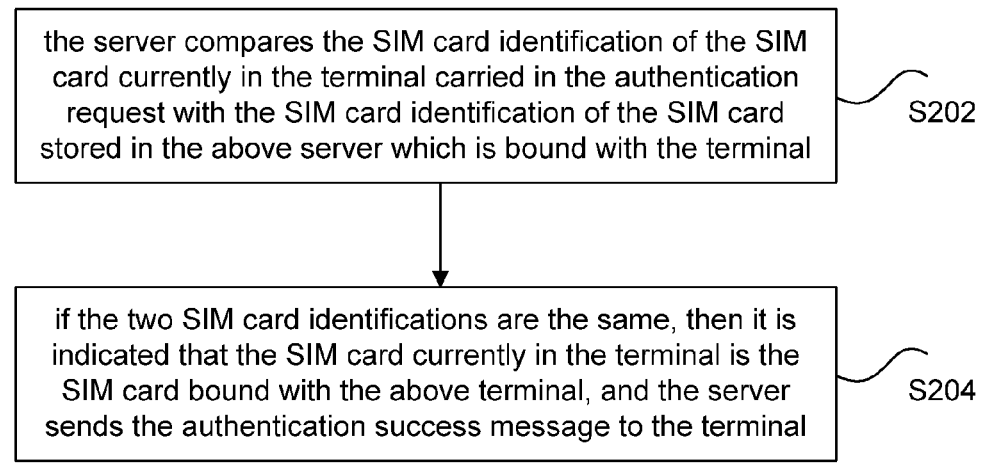
FIG. 2 is another preferred flowchart of a data access method according to an embodiment of the disclosure.

The procedure of authentication at the server side may be performed according to a SIM card identification. In a preferred embodiment, as shown in FIG. 2, the operation of returning the authentication success message by the server may include the following steps.

Step S202: the server compares the SIM card identification of the SIM card currently in the terminal carried in the authentication request with the SIM card identification of the SIM card stored in the above server which is bound with the terminal.

Step S204: if the two SIM card identifications are the same, then it is indicated that the SIM card currently in the terminal is the SIM card bound with the above terminal, and the server sends the authentication success message to the terminal.

Preferably, the terminal may also automatically initiate an unbinding request, so as to implement unbinding at the server side or to rebind a SIM card. However, in order to guarantee safety, only when the authentication is successful, unbinding is allowed to be performed. In a preferred embodiment, after the terminal receives the authentication success message returned by the server, the method may further include: the terminal may sends an unbinding request message to the server, in which the unbinding request message is used to indicate the server to delink a binding relationship stored in the above server between the terminal and the bound SIM card.

After registering at the server side, the terminal may receive a data self-destroying text message or instruction from the server side in any circumstance and destroy user data. That is, as long as receiving an indication of deleting data sent by the server, the terminal deletes data stored in the terminal itself, so as to guarantee data safety through the server. In a preferred embodiment, after the terminal receives the authentication success message returned by the server, the above method may further include: the terminal receives the data deleting request sent by the server, and deletes the date stored in the terminal itself corresponding to the data deleting request.

In an embodiment, a data access device is provided, which is located in the terminal. The data access device is configured to implement the above embodiments and the preferred embodiments, and what have already been explained will not be described again. As used below, a term "unit" or "module" may be implemented as software or hardware or their combination with a predetermined function. Although the device described in the embodiment below is preferably implemented with the software, the it is also possible to implement the device as the hardware or the combination of the software and the hardware.

Figure 3:
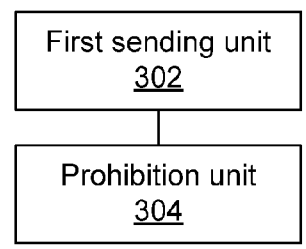
FIG. 3 is a preferred structural view of a data access device according to an embodiment of the disclosure.

FIG. 3 is a preferred structural view of a data access device according to an embodiment of the disclosure. The data access device, as shown in FIG. 3, includes: a first sending unit 302 and a prohibition unit 304. And this structure is explained below.

The first sending unit 302 is configured to send an authentication request to a server. The authentication request is used to request the server to verify whether a SIM card in a terminal is the SIM card bound with the terminal or not.

The prohibition unit 304, coupled with the first sending unit 302, is configured to, in a circumstance that the terminal receives an authentication failure message returned by the server, refuse a user corresponding to the SIM card in the terminal to access data stored in the above terminal. The authentication failure message is used to indicate that the SIM card in the terminal is not the SIM card bound with the terminal.

Figure 4:
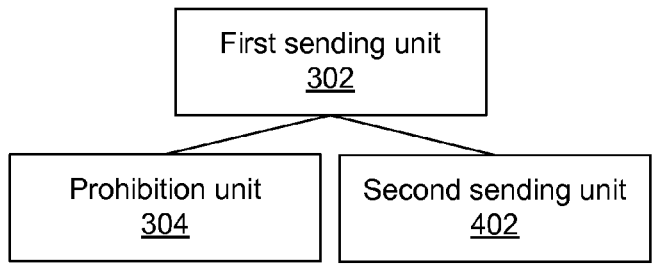
FIG. 4 is another preferred structural view of a data access device according to an embodiment of the disclosure.

In a preferred embodiment, as shown in FIG. 4, the above device may further include: a second sending unit 402, which is coupled with the first sending unit 302 and is configured to, after the terminal receives the authentication failure message returned by the server, send an indication message to the server. The indication message is used to indicate the server to send the authentication failure message to the user corresponding to the terminal.

The purpose of the embodiments of the disclosure is to provide a UE-card binding method, so that a card and private information in the card can be effectively protected. A UE-card binding procedure of an embodiment of the disclosure is shown below, which includes the following steps.

S1: a terminal initiates authentication of a SIM card or a U card through a service network. Preferably, the terminal is required to initiate an authentication request in one of the following circumstances:

1) the terminal boots up; 2) the U card/SIM card is changed; 3) changing of a terminal registration network occurs.

S2: a server end, such as a server, determines whether the SIM card is valid or not by comparing registration information reported by the terminal with registration information of the terminal stored on the server.

S3: if the authentication does not succeed, namely the reported registration information is invalid, then the user cannot read user data stored in the terminal. Preferably, the protected user data mainly includes:

1) a contact, a text message, and a call log; 2) a photograph, and a chat log; 3) private data or a directory of a certain application specified by the owner of the terminal.

S4: if the authentication succeeds, then an unbinding request may be initiated to set the terminal and the SIM card to be unbound. Only when the terminal is in the unbound state, the terminal can be bound with a new SIM card and re-register the new SIM card at the server end.

Preferably, the terminal cannot recognize other SIM cards when the terminal is bound with a SIM card. If an unauthenticated SIM card is inserted into the terminal, then the user date is unreadable, and the terminal is set to be in an invalid state.

When the terminal is in the invalid state, a background service program of the terminal may automatically initiate a message notification to the server end, so as to upload key information of the current SIM card to the server end.

After registering at the server side, the terminal may receive a data self-destroying message or instruction from the server end in any circumstance and destroy the user data. After self-destroying the data, the state of the terminal will not change.

The above schemes will be described in combination with several interaction figures below.

Figure 5:
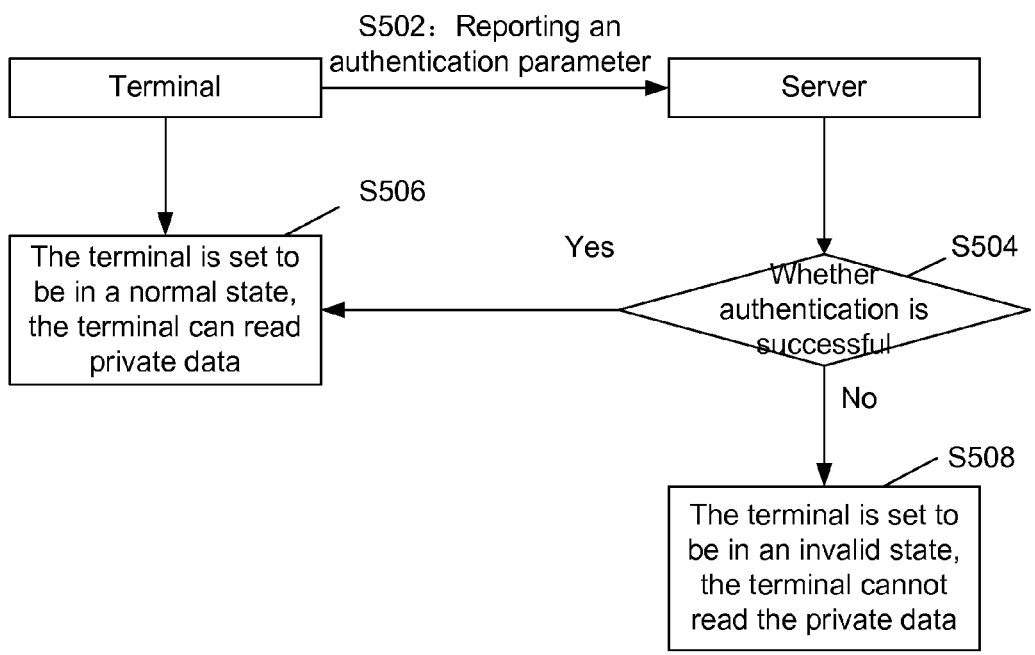
FIG. 5 is a flowchart of UE-card binding determination according to an embodiment of the disclosure.

As shown in FIG. 5, an initiation procedure includes the following steps.

Step S502: after power on, the terminal initiates an authentication request to the server which contains an authentication parameter. The authentication parameter includes an identification code of the terminal and the identification code of the card.

Step S504: the server performs authentication on the authentication parameter. If the authentication succeeds, the server sends an authentication success message to the terminal, and proceeds to Step S506; otherwise, proceeds to Step S508.

Step S506: after the terminal receives the authentication success message, the terminal is set to be in a valid state, namely in an authentication success state. As a result, the user can read data stored in the terminal;

Step S508: if the authentication does not succeed, then the server sends an authentication failure message to the terminal. After the terminal receives the authentication failure message, the terminal is set to be in an invalid state, triggering protection of the private data.

As shown in FIG. 6, a procedure of initiating an unbinding request by the terminal includes the following steps.

Step S602: after the authentication is successful, the terminal initiates an unbinding request through a specific application. The unbinding request contains the information of the card and the information of the terminal.

Step S604: After the server receives the unbinding request and the authentication is successful, the server sets the terminal and the card unbound, and sends unbinding confirmation information to the terminal.

Step S606: after receiving the unbinding confirmation information, the terminal sets itself to be in an unbinding state.

As shown in FIG. 7, the procedure of reporting key information by the terminal includes the following steps.

Step S702: if the terminal is in the invalid state after booting up, then the terminal automatically reports the current invalid state and the key information to the server through a background application.

Step S704: after receiving the message reported by the terminal, the server informs a registered user corresponding to this terminal of the key information through other channels.

Figure 8:
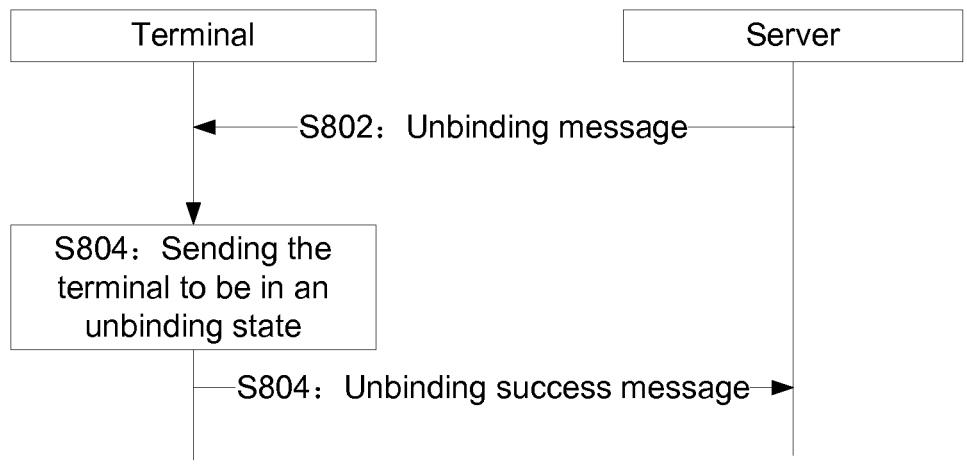
FIG. 8 is an interaction flowchart of unbinding initiated by a server end according to an embodiment of the disclosure.

As shown in FIG. 8, the procedure of unbinding initiated by the server includes the following steps.

S802: the server sends an unbinding message to the terminal.

S804: after receiving this unbinding message, the terminal sets itself to be in the unbinding state, and sends an unbinding success message to the server.

Figure 9:
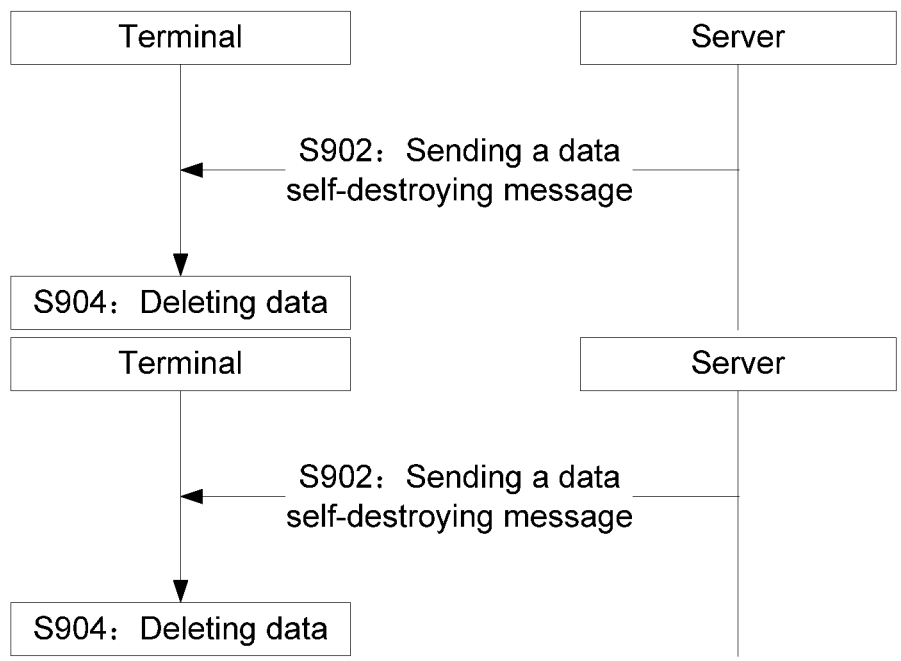
FIG. 9 is an interaction flowchart of self-destroying data by the terminal according to an embodiment of the disclosure.

As shown in FIG. 9, a private data self-destroying procedure includes the following steps.

Step S902: the server sends a data self-destroying message to the terminal, namely sending an indication message indicating the terminal to delete data stored in the terminal itself.

Step S904: after receiving the above message, the terminal starts to destroy private data and deletes the data stored inside. In some examples, all data stored in the terminal may be deleted, or some predetermined data may be deleted.

Through a method for implementing the UE-card binding in a wireless terminal provided by the disclosure, validity of the card is synchronously authenticated through a network, and the user's private data are protected through receiving a text message or an instruction by the background. When the terminal is in an invalid state, the terminal may actively initiate an interaction procedure with the server and upload the key information, so that the user data in the terminal may be effectively protected. Once the key information is reported to the server, the terminal can be tracked by the user after the terminal is lost. Moreover, leakage of the user data may be effectively avoided through a data self-destroying procedure.

In another embodiment, a software is provided, which is configured to execute the above embodiments and technical schemes described in the preferred embodiments.

In another embodiment, a storage medium is provided, in which the above software is stored. The storage medium includes but not limits to: an optical disk, a floppy disk, a hard disk, an erasable memory.

It can be seen from the above description that, the disclosure has the following technical effects. At a server side, the terminal and the SIM card are in a binding state, namely in a one-to-one relationship. The terminal may send an authentication request to the server to determine whether the SIM card currently in the terminal is the SIM card registered in the server or not, so as to determine whether the terminal is in safety. If the SIM card currently in the terminal is not the SIM card registered in the server, then it is determined that the terminal is not in safety. At this time, the terminal sets the data stored in the terminal itself to be unreadable, thus effectively improving data safety. Through the above way, the technical problem in the related art, that the terminal and the SIM card are only in a binding state, and the purpose of improving data safety is not achieved, is solved, and a technical effect of improving data safety in the terminal is achieved.

Of course, it should be understood by those skilled in this art that each of the above modules and steps of the disclosure may be implemented through a universal computing device, and may be integrated in a single computing device or be distributed in a network composed of multiple computing devices. Preferably, they may be implemented through program codes executable by the computing device, so that they may be stored in a storage device to be executed by the computing device. In a certain circumstances, the shown or described steps may be executed in a sequence which is different from that described here, or they may be manufactured separately into each integrated circuit module, or many modules or steps of them are manufactured into a single integrated circuit module. In this way, the disclosure is not limited to a combination of any specific hardware and software.

All those described above are only preferred embodiments of the disclosure, and are not used to limit the disclosure, and for those skilled in the art, the disclosure may have various alternations and changes. Any modification, alternation, improvement and etc. within the principle of the disclosure should be contained in the scope of protection of the disclosure.

INDUSTRIAL APPLICABILITY

In the embodiments of the disclosure, at the server side, the terminal and the SIM card are in a binding state, the terminal may send an authentication request to the server to determine whether the SIM card currently in the terminal is the SIM card registered in the server or not. If he SIM card currently in the terminal is not the SIM card registered in the server, then it is determined that the terminal is not in safety, and the terminal sets the data stored in the terminal itself to be unreadable, thus improving data safety effectively. Through the above way, the technical problem in the related art, that the terminal and the SIM card are only in a binding state, and the purpose of improving data safety is not achieved, is solved, and a technical effect of improving data safety in the terminal is achieved.

What is claimed is:

1. A data access method, comprising:
   sending, by a terminal, a server an authentication request to request the server to verify whether a Subscriber Identity Module (SIM) card in the terminal is a SIM card bound with the terminal; and
   in the case the terminal receives an authentication failure message returned by the server, refusing, by the terminal, a user corresponding to the SIM card in the terminal to access data stored in the terminal, wherein the authentication failure message indicates that the SIM card in the terminal is not the SIM card bound with by the terminal;
   wherein the method further comprises:
   after the terminal receives the authentication failure message returned by the server, uploading, by the terminal, identification information of the terminal and identification information of the SIM card in the terminal to the server.

2. The method according to claim 1, further comprising: after the terminal receives the authentication failure message returned by the server,
   sending, by the terminal, an indication message to the server, wherein the indication message indicates the server to send the authentication failure message to a user corresponding to the terminal.

3. The method according to claim 1, wherein the sending, by a terminal, a server an authentication, comprises at least one of the following:
   when the terminal detects that the terminal itself is booting up, sending, by the terminal, the authentication request to the server;

when the terminal detects that the SIM card in the terminal is not the same as a SIM card detected last time, sending, by the terminal, the authentication request to the server; and when the terminal detects that a current registration network is not the same as a registration network detected last time, sending, by the terminal, the authentication request to the server.

4. The method according to claim 1, further comprising: after the terminal sends the authentication request to the server, in the case the terminal receives an authentication success message returned by the server, allowing, by the terminal, the user corresponding to the SIM card in the terminal to access the data stored in the terminal, wherein the authentication success message indicates that the SIM card in the terminal is the SIM card bound with the terminal.

5. The method according to claim 4, wherein the returning of the authentication success message by the server comprises:

comparing, by the server, a SIM card identification of the SIM card in the terminal carried in the authentication request, with a SIM card identification of a SIM card stored in the server which is bound with this terminal; and in the case the two SIM card identifications are the same, sending, by the server, the authentication success message to the terminal.

6. The method according to claim 4, further comprising: after the terminal receives the authentication success message returned by the server, sending, by the terminal, an unbinding request message to the server, wherein the unbinding request message indicates the server to delink a binding relationship between the terminal and the bound SIM card stored in the server.

7. The method according to claim 4, further comprising: after the terminal receives the authentication success message returned by the server, receiving, by the terminal, a data deleting request sent by the server; and In response to the data deleting request, deleting, by the terminal, the data stored in the terminal.

8. A data access device located in a terminal, comprising:

a first sending unit, configured to send a server an authentication request to request the server to verify whether a Subscriber Identity Module (SIM) card in the terminal is a SIM card bound with the terminal; and a prohibition unit, configured to refuse, in the case the terminal receives an authentication failure message returned by the server, a user corresponding to the SIM card in the terminal to access data stored in the terminal, wherein the authentication failure message indicates that the SIM card in the terminal is not the SIM card bound with the terminal;

wherein the first sending unit is further configured to upload identification information of the terminal and identification information of the SIM card in the terminal to the server after the terminal receives the authentication failure message returned by the server.

9. The device according to claim 8, further comprising:

a second sending unit, configured to send, after the terminal receives the authentication failure message returned by the server, an indication message to the server, wherein the indication message indicates the server to send the authentication failure message to a user corresponding to the terminal.

10. The method according to claim 2, wherein the sending, by a terminal, a server an authentication, comprises at least one of the following:

when the terminal detects that the terminal itself is booting up, sending, by the terminal, the authentication request to the server;

when the terminal detects that the SIM card in the terminal is not the same as a SIM card detected last time, sending, by the terminal, the authentication request to the server; and when the terminal detects that a current registration network is not the same as a registration network detected last time, sending, by the terminal, the authentication request to the server.

* * * * *